United States Patent
Carroll et al.

(10) Patent No.: US 11,449,850 B2
(45) Date of Patent: Sep. 20, 2022

(54) CARD FALSE-POSITIVE PREVENTION

(71) Applicant: ValidSoft Limited, Dublin (IE)

(72) Inventors: Pat Carroll, Tullamore (IE); John Petersen, London (GB); Jonathan Alford, Orpington (GB)

(73) Assignee: ValidSoft Limited, Dublin (IE)

( * ) Notice: Subject to any disclaimer, the term of this patent is extended or adjusted under 35 U.S.C. 154(b) by 0 days.

(21) Appl. No.: 17/149,852

(22) Filed: Jan. 15, 2021

(65) Prior Publication Data

US 2021/0142305 A1  May 13, 2021

Related U.S. Application Data

(63) Continuation of application No. 13/138,286, filed as application No. PCT/GB2010/000139 on Jan. 28, 2010, now abandoned.

(30) Foreign Application Priority Data

Jan. 28, 2009 (GB) .................................. 0901407

(51) Int. Cl.
 *G06Q 20/18* (2012.01)
 *G06Q 20/20* (2012.01)
 (Continued)

(52) U.S. Cl.
 CPC ............ *G06Q 20/18* (2013.01); *G06Q 20/20* (2013.01); *G06Q 20/322* (2013.01);
 (Continued)

(58) Field of Classification Search
 None
 See application file for complete search history.

(56) References Cited

U.S. PATENT DOCUMENTS 5,719,918 A  2/1998  Serbetciouglu et al.
5,745,654 A  4/1998  Titan
(Continued)

FOREIGN PATENT DOCUMENTS

CN  1381008 A   11/2002
EP  1708527 A1  10/2006
(Continued)

OTHER PUBLICATIONS

F. S. Park, C. Gangakhedkar and P. Traynor, "Leveraging Cellular Infrastructure to Improve Fraud Prevention," 2009 Annual Computer Security Applications Conference, 2009, pp. 350-359, doi: 10.1109/ACSAC.2009.40.(Fraud Prevention) (Year: 2009).*

(Continued)

*Primary Examiner* — Chikaodinaka Ojiaku
(74) *Attorney, Agent, or Firm* — Pilsbury Winthrop Shaw Pittman LLP; Christopher L. Drymalla (57) ABSTRACT

A method for authenticating a transaction is disclosed. The method comprises the steps of: receiving data identifying a region where a transaction is being requested; receiving data identifying a mobile communication device associated with a person requesting the transaction; determining from Location Register (LR) data for the mobile communication device data identifying a region where the mobile communication device is located; comparing the data identifying the region where the transaction is being requested with the data identifying the region where the mobile communication device is located; and authenticating the transaction in dependence on the result of the comparison.

11 Claims, 2 Drawing Sheets

(51) Int. Cl.
*G06Q 20/40* (2012.01)
*G06Q 20/32* (2012.01)
*H04W 12/63* (2021.01)
*H04L 9/40* (2022.01)
*H04W 4/021* (2018.01)
*H04W 12/126* (2021.01)
*H04W 12/0431* (2021.01)
*H04W 4/029* (2018.01)
*H04W 12/06* (2021.01)

(52) U.S. Cl.
CPC ......... *G06Q 20/3224* (2013.01); *G06Q 20/40* (2013.01); *H04L 63/08* (2013.01); *H04L 63/107* (2013.01); *H04L 63/18* (2013.01); *H04W 4/021* (2013.01); *H04W 12/0431* (2021.01); *H04W 12/126* (2021.01); *H04W 4/029* (2018.02); *H04W 12/06* (2013.01); *H04W 12/63* (2021.01)

(56) References Cited

U.S. PATENT DOCUMENTS

| | | | |
|---|---|---|---|
| 5,950,176 A * | 9/1999 | Keiser | G06Q 40/06 705/36 R |
| 6,868,391 B1 | 3/2005 | Hultgren | |
| 7,246,740 B2 | 7/2007 | Swift et al. | |
| 7,513,418 B2 | 4/2009 | Dragt et al. | |
| 7,543,739 B2 | 6/2009 | Brown et al. | |
| 8,406,809 B2 * | 3/2013 | Florek | G07F 7/1008 455/558 |
| 8,630,906 B2 * | 1/2014 | Fisher | G06Q 30/06 705/16 |
| 8,706,588 B1 * | 4/2014 | Zhu | G06Q 20/3265 705/38 |
| 2002/0062310 A1 * | 5/2002 | Marmor | G06F 16/9537 |
| 2002/0108062 A1 | 8/2002 | Nakajima et al. | |
| 2002/0111919 A1 * | 8/2002 | Weller | G06Q 20/12 705/67 |
| 2002/0153415 A1 * | 10/2002 | Minami | G06Q 20/18 235/380 |
| 2003/0004866 A1 * | 1/2003 | Huennekens | G06Q 20/042 705/38 |
| 2003/0169881 A1 | 9/2003 | Niedermeyer | |
| 2003/0182194 A1 | 9/2003 | Choey et al. | |
| 2004/0064568 A1 * | 4/2004 | Arora | H04L 67/306 709/228 |
| 2004/0181487 A1 * | 9/2004 | Hanson | H04L 67/104 705/52 |
| 2004/0225520 A1 | 11/2004 | Aoki et al. | |
| 2005/0004872 A1 * | 1/2005 | Gavin | G06Q 40/02 705/42 |
| 2005/0114262 A1 * | 5/2005 | Howard | G06Q 20/102 709/224 |
| 2006/0198351 A1 | 9/2006 | Baek | |
| 2006/0237531 A1 | 10/2006 | Heffez et al. | |
| 2007/0030973 A1 | 2/2007 | Mikan | |
| 2007/0055785 A1 | 3/2007 | Stevens | |
| 2007/0108269 A1 | 5/2007 | Benco et al. | |
| 2007/0174082 A1 | 7/2007 | Singh | |
| 2007/0174116 A1 * | 7/2007 | Keith | G06Q 30/0267 705/14.23 |
| 2007/0255662 A1 * | 11/2007 | Tumminaro | G06Q 20/10 705/79 |
| 2007/0291915 A1 * | 12/2007 | Tseitlin | G06Q 20/105 379/114.04 |
| 2008/0007388 A1 | 1/2008 | Au et al. | |
| 2008/0027844 A1 * | 1/2008 | Little | G06Q 40/02 705/35 |
| 2008/0084272 A1 | 4/2008 | Modiano | |
| 2008/0156870 A1 | 7/2008 | Niedermeyer | |
| 2008/0162346 A1 | 7/2008 | Aaron et al. | |
| 2008/0207220 A1 | 8/2008 | Aaron | |
| 2008/0227471 A1 | 9/2008 | Dankar et al. | |
| 2008/0299989 A1 | 12/2008 | King et al. | |
| 2009/0011758 A1 | 1/2009 | Aoki et al. | |
| 2009/0012898 A1 | 1/2009 | Sharma et al. | |
| 2009/0102712 A1 * | 4/2009 | Heffez | H04W 12/12 342/450 |
| 2009/0157550 A1 * | 6/2009 | Fraher | G06Q 20/04 705/35 |
| 2009/0158404 A1 * | 6/2009 | Hahn | H04L 63/083 726/5 |
| 2009/0187488 A1 * | 7/2009 | Shamilian | G06Q 20/045 705/16 |
| 2009/0221265 A1 | 9/2009 | Liu et al. | |
| 2009/0254975 A1 | 10/2009 | Turnbull et al. | |
| 2009/0307028 A1 | 12/2009 | Eldon et al. | |
| 2010/0022254 A1 | 1/2010 | Ashfield et al. | |
| 2010/0138345 A1 | 6/2010 | Lekhtman et al. | |
| 2010/0145868 A1 | 6/2010 | Niedermeyer | |
| 2010/0291907 A1 | 11/2010 | MacNaughtan et al. | |
| 2011/0282789 A1 | 11/2011 | Carroll et al. | |
| 2014/0019352 A1 * | 1/2014 | Shrivastava | G06Q 20/02 705/41 |
| 2014/0180790 A1 * | 6/2014 | Boal | G06Q 40/10 705/14.42 |
| 2014/0222599 A1 * | 8/2014 | Wang | G06Q 30/0261 705/39 |
| 2015/0052010 A1 * | 2/2015 | Alba | G06Q 20/363 705/26.8 |
| 2015/0066756 A1 * | 3/2015 | Killian | G06Q 20/40 705/40 |
| 2015/0120559 A1 * | 4/2015 | Fisher | G06Q 20/3224 705/44 |
| 2015/0161597 A1 * | 6/2015 | Subramanian | G06Q 20/204 705/41 |
| 2015/0278776 A1 * | 10/2015 | Murray | G06Q 20/381 705/39 |
| 2015/0294314 A1 * | 10/2015 | Pattanayak | G06Q 20/409 705/44 |
| 2016/0012441 A1 * | 1/2016 | Goldberg | G06Q 20/401 705/44 |
| 2016/0140559 A1 * | 5/2016 | Jordan | G06Q 20/405 705/44 |
| 2017/0091735 A1 * | 3/2017 | Kulpati | G06Q 20/386 |
| 2017/0098209 A1 * | 4/2017 | Laracey | G06Q 20/3224 |
| 2017/0178098 A1 * | 6/2017 | Hu | G06Q 40/02 |
| 2017/0221066 A1 * | 8/2017 | Ledford | G06Q 20/4016 |
| 2017/0236124 A1 * | 8/2017 | Wagner | G06Q 20/3224 705/44 |
| 2017/0316394 A1 * | 11/2017 | Zhu | G06Q 20/3678 |
| 2017/0352036 A1 * | 12/2017 | Gurunathan | G06Q 20/34 |
| 2018/0121891 A1 * | 5/2018 | Hosny | G06Q 20/4016 |
| 2018/0174237 A1 * | 6/2018 | Hosny | G06Q 40/04 |
| 2018/0181964 A1 * | 6/2018 | Zagarese | G06Q 20/40145 |
| 2018/0211718 A1 * | 7/2018 | Heath | G16H 80/00 |
| 2018/0293573 A1 * | 10/2018 | Ortiz | G06Q 20/367 |
| 2018/0307859 A1 * | 10/2018 | LaFever | H04L 63/20 |
| 2018/0322473 A1 * | 11/2018 | Castinado | G06Q 20/36 |
| 2019/0139035 A1 * | 5/2019 | Mittal | G06Q 20/3226 |
| 2019/0156335 A1 * | 5/2019 | Safak | G06Q 20/385 |
| 2019/0180275 A1 * | 6/2019 | Safak | H04L 9/0637 |
| 2019/0332807 A1 * | 10/2019 | LaFever | G06F 21/6254 |
| 2020/0051117 A1 * | 2/2020 | Mitchell | G06Q 30/0239 |

FOREIGN PATENT DOCUMENTS

| | | |
|---|---|---|
| WO | 03/067506 A2 | 8/2003 |
| WO | 03/098525 A1 | 11/2003 |
| WO | 2009/009872 A2 | 1/2009 |

OTHER PUBLICATIONS

J Christopher Westland; Theodore H. Clark, "Secure Digital Payments," in Global Electronic Commerce: Theory and Case Studies, MIT Press, 1999, pp. 465-528. (Digital) (Year: 1999).*

M. Cooper, "The economics of collaborative production in the spectrum commons," First IEEE International Symposium on New (56) References Cited

OTHER PUBLICATIONS

Frontiers in Dynamic Spectrum Access Networks, 2005. DySPAN 2005., 2005, pp. 379-400 (Collaborative Production). (Year: 2005).*
Search Report issued in Application No. GB0901407.7 dated May 13, 2009 (3 pages).
Search Report issued in Application No. GB1005638.0 dated Aug. 25, 2010 (3 pages).
Chinese Office Action issued in Application No. 201080018099.8 dated Aug. 18, 2014, and partial English translation thereof (13 pages).
Examination Report issued in European Application No. 10 735 518.2 dated Sep. 8, 2015 (7 pages).

* cited by examiner

CARD FALSE-POSITIVE PREVENTION

CROSS REFERENCE TO RELATED APPLICATIONS

This is a continuation of U.S. Ser. No. 13/138,286, filed Jul. 27, 2011, which was the National Stage of International Application No. PCT/GB2010/000139, filed Jan. 28, 2010, which claims priority to United Kingdom application No. 0901407.7, filed Jan. 28, 2009, all of which are hereby incorporated by reference in their entireties.

FIELD OF THE INVENTION

This invention relates to determining the validity of a requested transaction and to false-positive prevention such as card present false-positive prevention. More particularly, this invention relates to financial transactions and to card-present false-positive prevention as well as to cross-border card present false-positive prevention.

BACKGROUND OF THE INVENTION

A false-positive event occurs when a user attempts to carry out a legitimate financial transaction which is declined because the financial provider (for example an issuing bank providing customers with a debit card or credit card) has incorrectly identified that transaction as being potentially fraudulent. The transaction may be a cross-border card-present transaction. A cross-border transaction may be one in which the transaction occurs in a different region to the region where the user is registered with the financial provider. That is to say, a cross-border card-present transaction could be one where a user withdraws cash from an ATM (automated teller machine) using his credit or debit card abroad or one where a user purchases goods at a Point-of-Sale (PoS) using his credit or debit card abroad. In both cases, the card must be physically present at the point of the transaction e.g. at the ATM or PoS. This is in contrast to a card-not-present transaction where the details of the card are present, for example the name of the card holder, the card number, expiry date, as well as security information. The card itself is not present at the location where the transaction is carried out. A card-not-present transaction may occur as a result of an internet or mail order transaction. Furthermore, the transaction may be a cross-border transaction, i.e. one where the transaction occurs in a country other than the country where the cardholder's issuing bank issued the card.

Cross-border card-present fraud is on the increase and now accounts for 40% of all card crime on UK issued cards. Technology such as Chip and PIN (personal identification number) is ineffective at preventing cross-border card-present fraud as skimmed (counterfeit) cards are simply used at ATMs and PoS devices in countries that don't support Chip and PIN, such as the US, when verification reverts to the card's magnetic stripe. Chip and PIN technology allows payment using debit or credit cards. Instead of using a signature to verify payments, the card user must enter a PIN number known only to the card holder.

Banks and other financial service providers generally attempt to prevent card-present fraud through the use of 3rd party software risk engines or in-house logic within the real-time authorisation process in an attempt to determine whether a transaction is likely to be fraudulent. Others will decline all cross-border transactions unless the cardholder has previously supplied the financial service provider with an accurate travel itinerary (which may still prove insufficient).

The main problem with the risk-engine approach is that risk engines are highly inaccurate in determining potentially fraudulent transactions. False-positive rates arising from such risk engines are extremely high, typically between 80% and 90%, resulting in substantial inconvenience and cost for the cardholders and banks alike. By false-positive rate, we mean the percentage of incorrectly declined transactions within the total number of declined transactions. Due to the high volumes and costs currently associated with determining false-positives, financial service providers cannot typically decline all of the transactions they would like to, resulting in fraudulent transactions being authorised. This arises when the cost of prevention exceeds the cost of fraud. The main costs to the financial service provider and the customer are incurred in the resolution process of a false-positive transaction.

Therefore, there is a problem that financial service providers often incorrectly identify and decline genuine transactions as potentially fraudulent, particularly when the transactions are carried out in an overseas country, which is not the card's country of issue, by the legitimate cardholder.

As a result, because the financial service provider has declined the transaction, it usually contacts the cardholder to confirm whether the transaction was actually fraudulent. This is done either manually by fraud centre operators, which is very expensive, or electronically by outbound dialling services, some of which can be inefficient and expensive. In many cases, however, because of the time taken for the financial service provider to instigate this process, the cardholder contacts the financial service provider directly (from abroad) to attempt to resolve the issue.

This is far from satisfactory because the cost of telephoning the financial service provider from abroad may be prohibitively high. Furthermore, the difference in time zone between countries may mean that the card holder is unable to contact the financial service provider if it is out of working hours in the country where the card was issued.

SUMMARY OF THE INVENTION

The invention is defined in its various aspects in the appended claims to which reference should now be made.

According to one aspect of the present invention, a method for deriving probability data relating to the validity of a requested financial transaction comprises the steps of: receiving location data relating to a requested transaction; receiving data identifying a mobile communication device associated with a person requesting the transaction; determining from Home Location Register (HLR) data for the mobile communication device location data for the mobile communication device; comparing the location data relating to the transaction with the location data from the mobile communication device; and determining probability data relating to the validity of the requested transaction in dependence on the result of the comparison.

According to another aspect of the present invention, apparatus for deriving probability data relating to the validity of requested financial transaction comprises: means for receiving location data relating to a requested transaction; means for receiving data identifying a mobile communication device associated with a person requesting the transaction; means for determining from Home Location Register (HLR) data for the mobile communication device location data for the mobile communication device; means for comparing the location data relating to the transaction with the location data from the mobile communication device; and means for determining probability data relating to the validity of the requested transaction in dependence on the result of the comparison.

Preferred embodiments of the invention derive probability data relating to the validity of a requested financial transaction by receiving location data relating to a requested transaction; receiving data identifying a mobile communication device associated with a person requesting the transaction; determine from Home Location Register (HLR) data for the mobile communication device location data for the mobile communication device; compare the location data relating to the transaction with the location data from the mobile communication device; and determine probability data relating to the validity of the requested transaction in dependence on the result of the comparison.

This allows the probability of legitimacy of a transaction to be determined to enable the issuing bank to better determine whether to allow or deny the transaction. This means that fewer false positive transactions occur, providing an improved service to the card holder and a reduction in cost to the issuing bank.

DETAILED DESCRIPTION OF PREFERRED EMBODIMENTS

An embodiment of the invention will now be described, by way of example only, with reference to the accompanying drawings in which.

Figure 1:
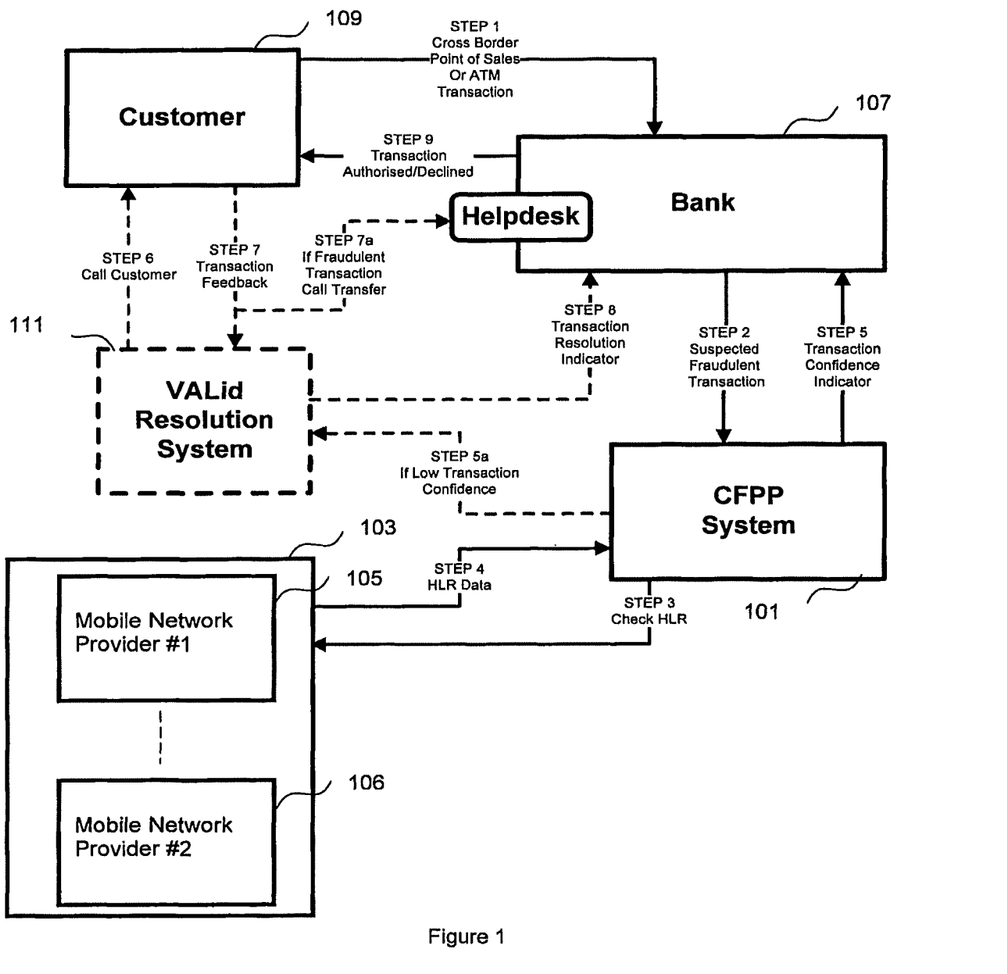
FIG. 1 shows a schematic diagram of the system architecture of an embodiment of the invention.

Referring to FIG. 1, a false positive prevention system comprises a server or computer 101. The server or computer 101 determines whether a transaction is likely to be fraudulent or not, as described in further detail below. The system can further comprise a mobile network data aggregator 103; mobile networks, 105, 106, a mobile communication device (not shown), a bank 107, and a customer 109. Furthermore, the system may also comprise a resolution system 111, although this feature is not essential, and so it is shown in dashed lines in FIG. 1. The main steps carried out by an embodiment of the invention will now be described.

Figure 2:
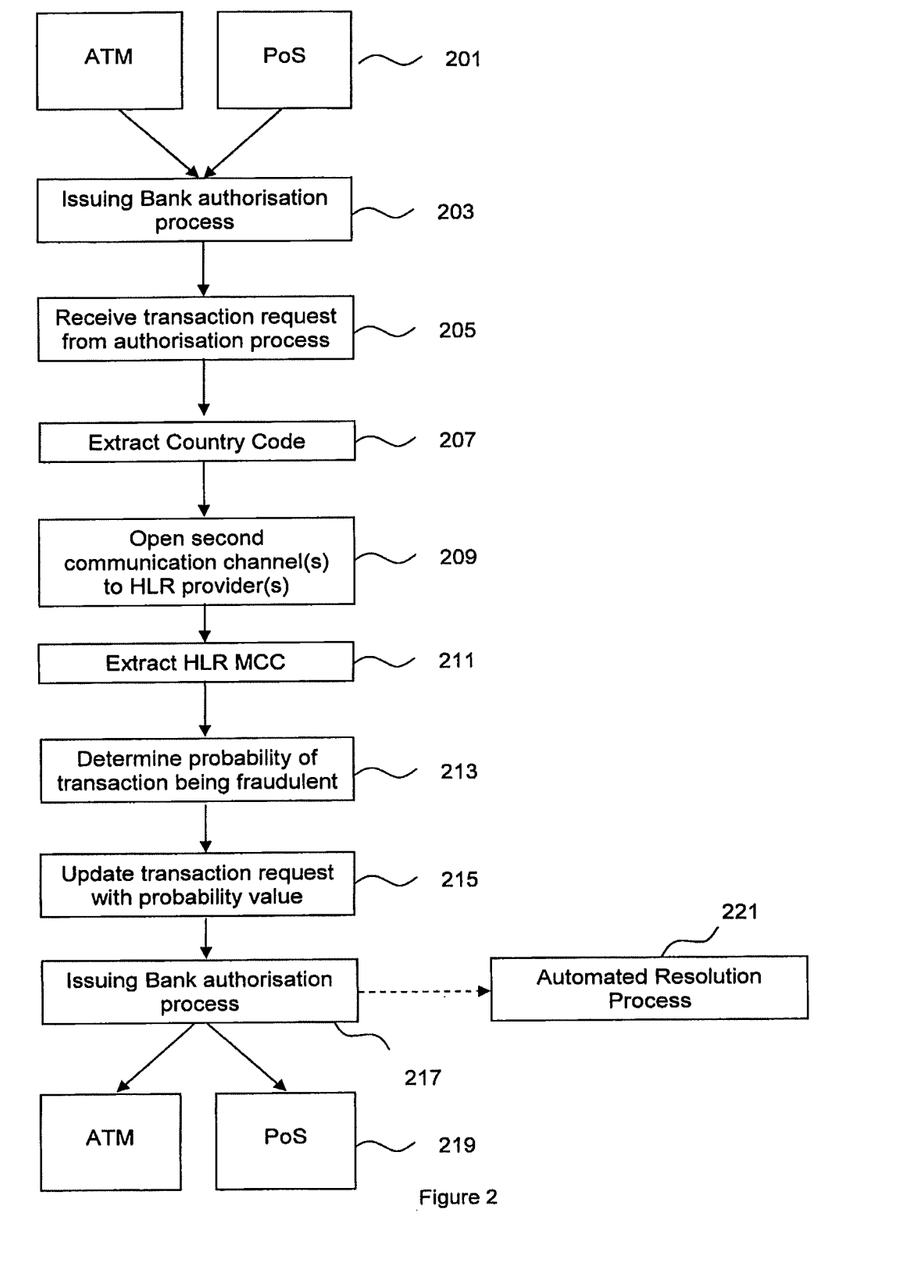
FIG. 2 shows a flow diagram showing the main steps performed by an embodiment of the invention.

Referring to FIG. 2, a user first starts a transaction at a means for performing or carrying out a transaction, at step 201. The means for carrying out the transaction may be an ATM or PoS. If the transaction is being requested at an ATM, the user inserts a card into the ATM and enters his PIN number. Alternatively, if the transaction is being carried out at a PoS, then the user may physically pass the card to the retailer who inserts the card into a card reader for processing. The user may optionally enter a PIN, if the card is a chip and PIN card. Other verification schemes such as signature may also be used, alternatively or in addition to a PIN. In all cases, the card comprises data associated with an individual or user which allows the user's account to be identified. Usually this information is in the form of a sequence of decimal numbers.

The ATM or PoS then contacts the financial service provider (card issuer) 107 at step 203, and the Issuing bank or financial service provider 107 authorisation process starts. In this, the financial service provider receives a transaction request, at step 205. The ATM or PoS sends information enabling the identity of the card holder to be deduced. This information may comprise the card number and may be sent by conventional means or using wireless means known to the skilled person. The information also may be sent in any suitably encrypted form known to the skilled person.

Once the bank or financial service provider 107 has received the transaction request, it may optionally perform additional processing to determine (using software risk engines or in-house logic) whether the transaction is likely to be fraudulent, for example if the transaction is for a large amount. However, if the financial service provider 107 determines that the transaction is likely to be genuine, then it can proceed directly to the authorisation process, at step 217, allowing the transaction at step 219. If the financial service provider determines that the transaction is likely to be fraudulent, then it passes the request to the server, 101.

However, if the financial service provider does not perform this additional processing, then it passes the transaction information directly to the server 101.

In one embodiment, the server 101 may be located within the financial service provider's organisation. However preferred embodiments have a server 101 which is physically separate from the financial service provider, and the transaction information (for example card number or/and name or/and transaction amount) is sent using wireless or conventional wire technology to the server, 101.

In one embodiment, the server 101 then extracts country code information contained within the transaction information, at step 207.

In an alternative embodiment, the financial service provider extracts the country code information from the transaction information. The financial service provider may also assign a reference number to the transaction. This has the advantage that potentially sensitive financial information such as the card number does not have to be sent to the server 101.

The financial service provider then searches a customer data base or look up table for information identifying a mobile communication device, as shown in table 1.

TABLE 1

Part of a look up table in an issuing bank.

| Card Holder Name | Card number | Telephone number |
|---|---|---|
| Mr A Smith | 5432 1234 5678 9998 | 00 44 7981 123 789 |
| Mr A Smith | 5432 1234 5678 9999 | 00 44 7981 123 789 |
| Mr N Jones | 5432 1234 0123 4567 | 00 44 7981 567 831 |

It does this by using the card holder identifying information (for example the card number) to search a look up table. The look up table has card holder identifying information for each card holder and also information enabling the card holder's mobile communication device to be determined. The card holder identifying information for each user is associated with at least one piece of information enabling the card holders communication device to be determined. If the mobile communication device is a portable telephone, then this information may be the (unique) telephone number of the portable telephone associated with the user carrying out the transaction. Further, each card holder may have more than one entry in the look up table because they may have more than one card with the financial service provider.

The financial service provider then sends the information identifying the mobile communication device as well as the extracted country code (i.e. location) relating to the transaction to the server 101. Preferably, a transaction reference number is also sent. This could be an arbitrary number assigned to the transaction by the financial service provider. This information may be sent in an encrypted form.

The server 101 receives the information identifying the mobile communication device (mobile telephone number) of the customer 109 from the issuing bank it then performs a HLR lookup from a commercially available database. An HLR database, is held by every mobile network provider and comprises information on that provider's permanent subscribers. Included in the information is the Network Country Code to which a subscriber is currently assigned, for use with customers who are roaming. The HLR database is frequently updated to take account of changes in the user's position.

The server 101 performs the HLR lookup by opening one or more communication channel(s) to a mobile network data aggregator 103, at step 209. The network data aggregator holds HLR information for mobile communication devices registered with a mobile network provider. The network data aggregator may have HLR data of more than one mobile network service provider 105, 106. This has the advantage that it is not necessary to interrogate each service provider separately in order to obtain the HLR data of a mobile communication devices registered with different service providers.

The network data aggregator 103 is able to extract the Mobile Country Code (MCC) indicator held for every permanent subscriber within the Home Location Register (HLR) database of the subscriber's mobile network, at step 211 using the information enabling the card holder's communication device to be determined (i.e. mobile telephone number). The MCC code associated with the information identifying the 15 mobile communication device (telephone number) is then passed to the server 101.

The server 101 then compares the received country indicator contained within the (cross-border) ATM or PoS transaction with the received Mobile Country Code (MCC) indicator.

At step 213, the probability of a transaction being legitimate is calculated. There are a number of ways in which this may be performed. The simplest way in which a legitimate transaction is detected is if the extracted country code of where the transaction is taking place matches the determined MCC indicator. For example, a transaction with an extracted country code relating to Australia will have a high probability of legitimacy if the determined MCC indicator also relates to Australia. In this case, the transaction is likely to be legitimate, because it is most likely that the legitimate card holder is in the same or a similar location to their mobile communication device. For a legitimate transaction the legitimate card holder carrying out the transaction is likely to have the mobile communication device on their person. In this case, the location of the transaction will be the substantially the same as the location of the user's mobile communication device.

The HLR data of a mobile communication device can be determined using techniques known to the skilled person, for example using the mobile GSM (Global System for Mobile) network or using $3^{rd}$ generation mobile networks. This allows the position of the mobile communication device to be determined to an accuracy of at least 50 m.

In one embodiment the system can be configured so that a transaction is determined to be genuine only if the thus determined location of the mobile communication device is within a predetermined distance of the location where the transaction is occurring, for example 50 or 100 m.

In an alternative embodiment, the system is configured such that a transaction is determined to be genuine only if the mobile communication device is determined to be in the same city or state or country as the place where the transaction is taking place. This embodiment is useful because card users frequently leave mobile devices at home or in hotels when performing a transaction.

In some cases, the transaction country code will not match the MCC indicator, even though the transaction is being carried out by a legitimate user. This could occur if the transaction is taking place close to the border of a country, for example the border or France and Germany. In this case, if the MCC indicator is determined to be close to a border, the transaction may be allowed even though the transaction country code and the MCC indicator do not match, provided the transaction is occurring in a country which neighbours (i.e. within a predetermined distance) of the country code determined using the MCC.

The system may also determine the probability of a transaction being fraudulent, at step 213, rather than just determining whether the transaction is genuine (1) or fraudulent (0). In this case a number between 0 and 1 may be assigned to the transaction.

In one embodiment, the probability of the transaction being fraudulent is larger when the distance between the location of the transaction and the user's mobile communication device is larger.

At step 215, the transaction request is updated with the determined probability value, for example 0.9 (meaning that there is a 90% probability that the transaction is genuine) or whole number for example 1 or 0 (meaning that the transaction has determined with 100% probability of it being genuine or fraudulent). The probability is then passed to the bank or financial service provider 101 as part of the transaction information, and at step 217, the bank or financial service provider allows or denies the transaction in dependence upon the determined probability. If the transaction is allowed it is completed at step 219.

In this way, embodiments of the invention reduce the incidence of false-positive transactions.

A consequence of reducing the incidence of false-positives is a potential increase in the detection of true positives (fraudulent transactions) by allowing more suspect transactions to be declined. By true positive we mean a fraudulent transaction declined for being identified as potentially fraudulent. Embodiments of the invention therefore, to achieve maximum effectiveness, require cardholders to take and activate their mobile communication devices (mobile phones) abroad (though not necessarily to carry them on their person) and also require issuing banks to record accurate mobile phone information on their cardholder databases. This is an increasing trend due to the increasing incidence of cross-border false-positives and is actively encouraged by banks. The Association for Payment Clearing Services (APACS) advises card holders to make sure their card company has up-to-date contact details for them, including a mobile number, especially if travelling overseas.

In a further embodiment, an automated resolution process, at step 221, is provided, however this is optional. This allows for the immediate and automatic resolution of any transaction declined through having a low probability of legitimacy (potentially fraudulent transaction). The automated resolution process predicts if the decline is a true-positive (fraudulent transaction) or false-positive (legitimate transaction). Depending on which outcome, the automated resolution process connects the cardholder directly with the bank or financial service provider (i.e. fraud department) to resolve the issue of the fraudulent card and any previous fraudulent transactions. Alternatively it can update the cardholder's information and request the cardholder to resubmit the declined transaction. Because the resolution process can occur immediately the transaction is declined, it streamlines the process, provides a better customer experience and provides the opportunity for the cardholder to retry the transaction, in the case of false-positive, whilst still in the vicinity of the original declined transaction.

Embodiments of the invention use HLR information in conjunction with card-present financial transaction data to predict the probability of legitimacy. Using HLR databases to determine the country location of a subscriber has advantages over techniques such as Latitude/Longitude tracking in terms of cost, timeliness and privacy. Embodiments of the invention allow more true positive cross-border card present financial transactions to be identified, while also reducing the number of false positive transactions.

Embodiments of the invention also allow invalid mobile telephone numbers to be identified (ones that are no longer in use) using the HLR information thereby avoiding processing errors. This also allows these numbers to be identified and for the financial service provider to request new telephone numbers from the card holder. Embodiments of the invention can run as a hosted service or inhouse. Although embodiments of the invention have been described with reference to financial cards, it is not in fact necessary for any card to actually be present when the transaction is taking place. For example, a user may use biometric information such as finger print(s) or retina scan(s) as a unique identifier of their account whilst also giving authorisation information. The authorisation information can be an additional PIN or can be the biometric information itself.

In other embodiments, a user can be provided with a unique combination of code or/and pin number to enter at an ATM. This allows their financial service provider to provide the user with cash from the ATM without the need for a physical card. The withdrawn cash is then debited from the user's account which is identified using the unique code.

It will be appreciated that the present invention finds applicability in determining the validity or authenticity of any transaction being attempted at an ATM or PoS or any other means for carrying out a transaction. The transaction may be a financial transaction. Further, embodiments of the invention may be implemented in hardware or software. Embodiments may be implemented in the ATM or PoS or other means for carrying out a transaction, although, it is preferable to implement the system at a centralised computer or server 101. In addition to using Home Location Register database information, the system 101 may use Visitor Location register database information. These databases may be referred to as Location Register (LR) databases.

In one embodiment, the location data relating to where a financial transaction is being requested may comprise data identifying a region where a transaction is being requested. For example, embodiments of the invention may use an ATM country code indicator or a PoS country code indicator. These financial transaction country indicators may be labels such as "UK" or "44" and serve to identify a particular region, but do not contain sufficient information to determine where the region is located or even where within the region the ATM or PoS is located or positioned.

Further, the location data of the mobile communication device may comprise data identifying a region where a mobile communication device is located.

For example, embodiments of the invention may use a Mobile Country Code (MCC) indicator, such as "UK" or "44". The server 101 may extract the Mobile Country Code indicator from the Home Location Register Data. The server 101 may extract the Mobile Country Code indicator from the LR data of a number of mobile devices using the data identifying a mobile communication device which is associated with a person requesting the transaction. The LR data corresponding to the mobile device of the user requesting the transaction may then be searched to extract the country code indicator. For example, a search for the field "MCC" in the LR database, will reveal a match, and the data value associated with that match is the MCC value or indicator. The data identifying a mobile communication device may be a mobile telephone number or other subscriber information such as an International Mobile Subscriber Identity (IMSI).

The data identifying a region where a mobile communication device is located may be a label such as "UK" or "44" and serve to identify a particular region where the device is located, but do not contain sufficient information to determine where the region is located or even where within the region the device is located or positioned.

Using data identifying a region rather than location data itself has advantages in that the server 101 does not know the position of the mobile communication device, so that a user's privacy is maintained. The server 101 just knows what the value is of the identifier which represents a particular region. For example, if the user's mobile communication device is located within the UK, the data identifying the region where the mobile device is located may be a number such as "44". This information does not allow the position of the mobile communication to be determined.

Further, using data identifying a region rather than the location data itself also has the advantage in that the server 101 or computer does not know the position or location of the ATM or PoS where the user is attempting a transaction. This also has benefits to the user in terms of privacy.

Further, the indicator or data identifying a region where the financial transaction is requested are not unique. That is to say, all ATMs or PoSs within a particular geographic region are assigned a particular country indicator, such as "44".

Further, the indicator or data identifying a region where a mobile communication device associated with a user requesting a transaction is located is also not unique. That is to say, the mobile phone country indicator assigned to a particular phone is not unique and that a number of mobile phones within a particular region or country share the same code.

Having indicators which are not unique has the advantage that the step of comparing the data identifying a region where a financial transaction is requested with the data identifying a region where a mobile communication device is located is simplified.

This is because it is not necessary to determine the distance of the ATM or PoS from the mobile communication device, for example using the position (x1, y1, z1) of the mobile device and the position (x2, y2, z2) of the ATM or PoS. All that is required is to compare the data or identifier of the region where the ATM or PoS is located with the data identifier of the region where the mobile communication device is located. This simplifies, and hence, improves the response time of the system. It also advantageous in terms of increased privacy for the user.

A transaction may be validated or determined as authentic if the region identifier where the ATM or PoS is located matches the region identifier where the mobile communication device is located.

In some countries additional identifiers of the region in which the mobile device is located may also be provided. For example, for transactions within the United States, the data identifying the regions where a mobile device is located also may comprise a city or state identifier. This identifier is also located in the HLR data. However, these city or state identifiers are also not unique in that a number of mobile devices may be assigned the same city or state identifier. Further, the city or state identifiers may not contain sufficient information to enable the location of the region covered by the city or state to be determined or indeed to determine where within the city or state region the mobile device is located.

As previously described, embodiments of the invention may receive the HLR data from a mobile network aggregator. Further, the transaction may be a card-present transaction or a card-not-present transaction or a cross-border transaction. The location data of the mobile communication device may be receivable from more than one network aggregator. The LR data may comprise data from more than one mobile network service provider. Further, a probability of legitimacy of the requested transaction may be determined in real time or post authorisation.

Further, embodiments of the invention may decline a transaction if a determined probability of legitimacy is below a predetermined value. The probability data may also be used to identify a false positive transaction. The transaction data and the data identifying a mobile communication device may be received from a financial service provider. The method may also comprise the step of automatically contacting the person requesting the transaction, for example via telephone.

Embodiments of the invention may also comprise the step of controlling a means for carrying out a transaction in dependence upon the result of the comparison. This step may be an alternative to the step of authenticating the transaction in dependence on the result of the comparison.

For example, if the data identifying the region where the transaction is being requested matches the data identifying the region where the mobile communication device is located an ATM or PoS or other means for carrying out a transaction may be controlled such that cash is dispensed or such that the PoS performs the transaction.

The invention claimed is:

1. A system for declining potentially fraudulent automated teller machine (ATM) financial transaction requests, the system comprising:
a financial services server; and
a transaction terminal comprising an ATM located at a geographic location, the ATM configured to:
receive, from a requesting user located at the ATM, a financial transaction request comprising a request to withdraw cash for a monetary amount and being associated with an identifier associated with a user; and
send, to the financial services server, transaction data for the financial transaction request, the transaction data comprising:
the monetary amount; and
the identifier associated with the user;
the financial services server configured to:
determine, based on the monetary amount received, whether the monetary amount exceeds a predefined transaction amount threshold;
in response to determining that the monetary amount does not exceed the predefined transaction amount threshold, control the ATM to dispense cash in the monetary amount to the requesting user to complete the financial transaction request;
in response to determining that the monetary amount exceeds the predefined transaction amount threshold, performing a location-based transaction assessment, the location-based transaction assessment comprising:
determining, based on the indication of the identifier associated with the user, a user identifier corresponding to the identifier associated with the user;
sending, to a mobile network provider, a query for an indication of a current location of a mobile electronic device associated with the user identifier;
receiving, from the mobile network provider responsive to the query, location data that is indicative of the location of the mobile electronic device associated with the user identifier;
determining, based on the location data, a current geographic location of the mobile electronic device;
determining whether the current geographic location is within a predefined distance of a border of a geographic region associated with the geographic location of the ATM;
in response to determining that the current geographic location is within a predefined distance of a border of a geographic region associated with the geographic location of the ATM, control the ATM to dispense cash in the monetary amount to the requesting user to complete the financial transaction request;
in response to determining that the current geographic location is not within a predefined distance of a border of a geographic region associated with the geographic location of the ATM:
control the transaction terminal to not dispense cash in the monetary amount to decline completion of the financial transaction request; and
causing an indication of the declining of the financial transaction request to be provided to the user.

2. The system of claim 1, wherein the indication of the declining of the financial transaction request comprises connection of the user with a financial service provider regarding the financial transaction request.

3. The system of claim 1, wherein the indication of the declining of the financial transaction request comprises a request for resubmission of the financial transaction requested.

4. A financial services system for declining potentially fraudulent automated teller machine (ATM) financial transaction requests, the financial services system comprising:
a financial services server configured to:
receive, from a transaction terminal, transaction data for a financial transaction request submitted by a requesting user located at the transaction terminal, the transaction terminal being an ATM located at a geographic location, the financial transaction request comprising a request to withdraw cash for a monetary amount and being associated with an identifier associated with a user, the transaction data comprising:
the monetary amount; and
the identifier associated with the user;
determine, based on the monetary amount received, whether the monetary amount exceeds a predefined transaction amount threshold;
in response to determining that the monetary amount does not exceed the predefined transaction amount threshold, control the ATM to dispense cash in the monetary amount to the requesting user to complete the financial transaction request; and in response to determining that the monetary amount exceeds the predefined transaction amount threshold, performing a location-based transaction assessment, the location-based transaction assessment comprising:

sending, to a mobile network provider, a query for an indication of a current geographic location of a mobile electronic device associated with the identifier;

receiving, from the mobile network provider responsive to the query, the current geographic location of the mobile electronic device associated with the identifier;

determining whether the current geographic location is within a predefined distance of a border of a geographic region associated with the geographic location of the ATM;

in response to determining that the current geographic location is within a predefined distance of a border of a geographic region associated with the geographic location of the ATM, controlling the ATM to dispense cash in the monetary amount to the requesting to complete the financial transaction request; and in response to determining that the current geographic location is not within a predefined distance of a border of a geographic region associated with the geographic location of the ATM:

controlling the ATM to not dispense cash in the monetary amount to decline completion of the financial transaction request; and causing an indication of the declining of the financial transaction request to be provided to the user.

5. The system of claim 4, wherein the indication of the declining of the financial transaction request comprises connection of the user with a financial service provider regarding the financial transaction request.

6. The system of claim 4, wherein the indication of the declining of the financial transaction request comprises a request for resubmission of the financial transaction requested.

7. A method for declining a potentially fraudulent automated teller machine (ATM) financial transaction request, the method comprising:

receiving, by a financial services server from a transaction terminal, transaction data for a financial transaction request submitted by a requesting user located at the transaction terminal, the transaction terminal being an ATM located at a geographic location, the financial transaction request comprising a request to withdraw cash for a monetary amount and being associated with a monetary amount and an identifier associated with the user, the transaction data comprising:

the monetary amount; and the identifier associated with the user;

determine, by the financial services server, that the monetary amount exceeds a predefined transaction amount threshold;

performing, by the financial services server in response to determining that the monetary amount does exceed the predefined transaction amount threshold, a location-based transaction assessment, the location-based transaction assessment comprising:

sending, by the financial services server to a mobile network provider, a query for an indication of a current geographic location of a mobile electronic device associated with the identifier;

receiving, by the financial services server from the mobile network provider responsive to the query, the current geographic location of the mobile electronic device associated with the identifier;

determining, by the financial services server, that the current geographic location is not within a predefined distance of a border of a geographic region associated with the geographic location of the ATM;

in response to the financial services server determining that the current geographic location is not within a predefined distance of a border of a geographic region associated with the geographic location of the ATM:

controlling, by the financial services server, the transaction terminal to not dispense cash in the monetary amount to decline completion of the financial transaction request; and providing, to the user, an indication of the declining of the financial transaction request.

8. The method of claim 7, further comprising:

receiving, by the financial services server from a second transaction terminal, second transaction data for a second financial transaction request submitted by a second requesting user located at the second transaction terminal, the second transaction terminal being a second ATM located at a second geographic location, the second financial transaction request comprising a second request to withdraw cash for a second monetary amount and being associated with a second identifier associated with a second user, the second transaction data comprising:

the second monetary amount; and the second identifier associated with the second user;

determine, by the financial services server, that the second monetary amount does not exceed a predefined transaction amount threshold; and controlling, by the financial services server in response to determining that the second monetary amount does not exceed the predefined transaction amount threshold, the second ATM to dispense cash in the second monetary amount to the second requesting user to complete the second financial transaction request.

9. The method of claim 8, further comprising:

receiving, by the financial services server from a third transaction terminal, third transaction data for a third financial transaction request submitted by a third requesting user located at the third transaction terminal, the third transaction terminal being a third ATM located at a third geographic location, the third financial transaction request comprising a third request to withdraw cash for a third monetary amount and that is associated with a third identifier associated with a third user, the third transaction data comprising:

the third monetary amount; and the third identifier associated with the third user;

determine, by the financial services server, that the third monetary amount exceeds a predefined transaction amount threshold;

performing, by the financial services server in response to determining that the third monetary amount exceeds the predefined transaction amount threshold, a second location-based transaction assessment, the second location-based transaction assessment comprising:

sending, by the financial services server to a second mobile network provider, a query for an indication of a current geographic location of a second mobile electronic device associated with the third identifier;

receiving, by the financial services server from the second mobile network provider responsive to the second query, the current geographic location of the third mobile electronic device associated with the third identifier;

determining, by the financial services server, that the current geographic location is within a predefined distance of a border of a geographic region associated with the geographic location of the third ATM; and controlling, by the financial services server in response to determining that the current geographic location of the third mobile electronic device corresponds to the geographic location of the third ATM, the third ATM to dispense cash in the third monetary amount to the third requesting user to complete the third financial transaction request.

10. The method of claim 7, wherein the indication of the declining of the financial transaction request comprises connection of the user with a financial service provider regarding the financial transaction request.

11. The method of claim 7, wherein the indication of the declining of the financial transaction request comprises a request for resubmission of the financial transaction requested.

* * * * *

UNITED STATES PATENT AND TRADEMARK OFFICE
CERTIFICATE OF CORRECTION

PATENT NO. : 11,449,850 B2
APPLICATION NO. : 17/149852
DATED : September 20, 2022
INVENTOR(S) : Pat Carroll et al.

It is certified that error appears in the above-identified patent and that said Letters Patent is hereby corrected as shown below:

In the Claims

In Claim 4, Column 11, Line 25 should read as follows:
4. A financial services system for declining potentially fraudulent automated teller machine (ATM) financial transaction requests, the financial services system comprising: a financial services server configured to: receive, from a transaction terminal, transaction data for a financial transaction request submitted by a requesting user located at the transaction terminal, the transaction terminal being an ATM located at a geographic location, the financial transaction request comprising a request to withdraw cash for a monetary amount and being associated with an identifier associated with a user, the transaction data comprising: the monetary amount; and the identifier associated with the user; determine, based on the monetary amount received, whether the monetary amount exceeds a predefined transaction amount threshold; in response to determining that the monetary amount does not exceed the predefined transaction amount threshold, control the ATM to dispense cash in the monetary amount to the requesting user to complete the financial transaction request; and in response to determining that the monetary amount exceeds the predefined transaction amount threshold, performing a location-based transaction assessment, the location-based transaction assessment comprising: sending, to a mobile network provider, a query for an indication of a current geographic location of a mobile electronic device associated with the identifier; receiving, from the mobile network provider responsive to the query, the current geographic location of the mobile electronic device associated with the identifier; determining whether the current geographic location is within a predefined distance of a border of a geographic region associated with the geographic location of the ATM; in response to determining that the current geographic location is within a predefined distance of a border of a geographic region associated with the geographic location of the ATM, controlling the ATM to dispense cash in the monetary amount to the requesting user to complete the financial transaction request; and in response to determining that the current geographic location is not within a predefined distance of a border of a geographic region associated with the geographic location of the ATM: controlling the ATM to not dispense cash in the monetary amount to decline completion of the financial transaction request; and causing an indication of the declining of the financial transaction request to be provided to the user.

Signed and Sealed this
Thirteenth Day of December, 2022

*Katherine Kelly Vidal*

Katherine Kelly Vidal
*Director of the United States Patent and Trademark Office*